(12) United States Patent
Wiederin et al.

(10) Patent No.: US 7,275,162 B2
(45) Date of Patent: *Sep. 25, 2007

(54) ON-LINE DIRECTORY ASSISTANCE SYSTEM

(75) Inventors: Shawn E. Wiederin, Cedar Rapids, IA (US); Richard G. Moore, Cedar Rapids, IA (US); Duraisamy Gunasekar, Cedar Rapids, IA (US); Gregory Mumford, Marion, IA (US); Lonnie S. Clabaugh, San Pedro, CA (US); Jon Abel, Cedar Rapids, IA (US); Kolin G. Hogue, Kalona, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/359,994

(22) Filed: Feb. 22, 2006

(65) Prior Publication Data

US 2006/0156037 A1 Jul. 13, 2006

Related U.S. Application Data

(63) Continuation of application No. 09/836,147, filed on Apr. 17, 2001, now Pat. No. 7,127,617.

(60) Provisional application No. 60/198,480, filed on Apr. 17, 2000.

(51) Int. Cl.
*H04L 9/32* (2006.01)
*H04L 9/00* (2006.01)

(52) U.S. Cl. .................. 713/189; 713/193; 713/150

(58) Field of Classification Search ............... 713/150, 713/160–161, 166–167, 170, 189, 193; 726/1–4; 705/50, 70; 709/200, 217, 219
See application file for complete search history.

(56) References Cited

U.S. PATENT DOCUMENTS 5,003,584 A 3/1991 Benyacar et al.

(Continued)

FOREIGN PATENT DOCUMENTS

EP 0 633 583 1/1995

(Continued)

OTHER PUBLICATIONS

BOC Expands Directory Options, BOC Week, Jan. 13, 1992.

(Continued)

*Primary Examiner*—Hosuk Song

(57) ABSTRACT

An approach for providing an on-line directory assistance services is disclosed. An on-line directory assistance system includes a server that receives a request message for information over a packet switched network from an access device. The server forwards the information to the access device in response to the request message, wherein the information includes basic content data and optional enhanced content data. The system also includes a database that stores the information. Further, the server selectively receives a modification message to modify the enhanced content data associated with the information from the access device. The server then updates the database based upon the modification message.

24 Claims, 15 Drawing Sheets

U.S. PATENT DOCUMENTS

| | | |
|---|---|---|
| 5,204,894 A | 4/1993 | Darden |
| 5,386,464 A | 1/1995 | Pruitt |
| 5,483,586 A | 1/1996 | Sussman |
| 5,740,231 A | 4/1998 | Cohn et al. |
| 5,778,059 A | 7/1998 | Loghmani et al. |
| 5,787,304 A | 7/1998 | Hodges et al. |
| 5,903,874 A | 5/1999 | Leonard et al. |
| 5,907,603 A | 5/1999 | Gallagher et al. |
| 5,912,954 A | 6/1999 | Whited et al. |
| 5,940,487 A | 8/1999 | Bunch et al. |
| 5,943,611 A | 8/1999 | Moelne |
| 5,953,005 A | 9/1999 | Liu et al. |
| 5,960,442 A | 9/1999 | Pickering |
| 5,961,601 A | 10/1999 | Iyengar |
| 6,000,031 A | 12/1999 | Bingaman et al. |
| 6,020,916 A | 2/2000 | Gerszberg et al. |
| 6,052,439 A | 4/2000 | Gerszberg et al. |
| 6,212,506 B1 | 4/2001 | Shah et al. |
| 6,240,518 B1 | 5/2001 | Ooki et al. |
| 6,456,709 B1 | 9/2002 | Cox et al. |
| 6,658,455 B1 | 12/2003 | Weinman, Jr. |
| 6,744,891 B1 | 6/2004 | Allen |
| 6,771,597 B2 | 8/2004 | Makansi et al. |
| 2002/0115431 A1 | 8/2002 | Cox et al. |

FOREIGN PATENT DOCUMENTS

| | | |
|---|---|---|
| EP | 0 781 026 | 6/1997 |
| EP | 0 782 315 | 7/1997 |
| EP | 0 876 042 | 11/1998 |
| EP | 0 926 875 | 6/1999 |
| WO | 96/34341 | 10/1996 |
| WO | 98/35481 | 8/1998 |
| WO | 99/05845 | 2/1999 |
| WO | 99/55058 | 10/1999 |
| WO | 00/39987 | 7/2000 |

OTHER PUBLICATIONS http://www.infospace.com/; Printed Jul. 27, 2001.
http://www.qwestdex.com/; Printed Jul. 27, 2001.
http://www.555-1212.com/; Printed Jul. 27, 2001.
http://wwcn.whowhere.lycos.com/; Printed Jul. 27, 2001.
www.searchnetworking.techtarget.com; Printed from Google Sep. 20, 2004.

DIRECTORY ASSISTANCE

Acme Cans     100 First Street     (319)555-4567     Cedar Rapids, IA 52402

Fax No.: _____ *803*
E-mail: _____ *805*
URL: _____ *807*

[Submit] *809*     [Reset] *811*

FIG. 8

ON-LINE DIRECTORY ASSISTANCE SYSTEM

CROSS-REFERENCES TO RELATED APPLICATIONS

This application is a continuation of U.S. patent application Ser. No. 09/836,147, filed Apr. 17, 2001, now U.S. Pat. No. 7,127,617 entitled "On-Line Directory Assistance System", and which claims the benefit of the earlier filing date under 35 USC 119(e) of U.S. Provisional Patent Application No. 60/198,480, filed Apr. 17, 2000, entitled "Ultimate Directory Assistance Suite," the entirety of each which is incorporated herein by reference.

BACKGROUND OF THE INVENTION

1. Field of the Invention

The present invention relates to information systems, and is more particularly related to data processing over a packet switched network.

2. Discussion of the Background

Directory assistance services provide a viable source of revenue for telecommunication service providers and has proven to be an efficient mechanism for a customer to obtain information about a party whom the customer seeks to contact. Directory information is maintained by data providers (e.g., local exchange carriers (LECs), and Regional Bell Operating Companies (RBOCs), who provide directory "listings" to the telecommunication service providers for a fee. These data providers, as third parties to the service provider, typically require compensation when a listing is used. The conventional voice access directory assistance (i.e., local or national directory assistance) provides automated prompts to the customer to obtain the listing that the customer is seeking. This conventional system employs a live operator to ensure that the customer is given the proper listing. For example, a typical local scenario involves a customer dialing "411" on a telephone station and being prompted to state the name of the party that the customer seeks to contact as well as the city that the party resides. If there exists multiple listings, the live operator may intervene to gather more detailed information so that the correct and intended listing is provided. The live operator may, for instance, ask the customer to provide address information to determine which one of the multiple listings the customer seeks to obtain; thereafter, a proper determination of the desired listing can be made by the live operator. In this manner, only the actual listing that the customer utilizes translates into a charge for the customer; that is, the customer is not charged for multiple listings. For the purpose of usage tracking, standard call detail records can be employed to track charges. Additionally, such a directory assistance system ensures accuracy of the listing through the intervention of a live operator. For the service provider, the greater time that is spent servicing a particular customer through operator intervention, the greater the loss of potential revenue, in terms of opportunity cost.

Given the popularity of the World Wide Web—for that matter, the Internet in general—on-line directory services have emerged to provide an analogous service to that of the telephony based directory service. However, usage tracking with respect to on-line directory service systems is difficult and infeasible. Accordingly, many directory services that are provided on-line are provided as a free service, potentially resulting in a lost of revenue to the service provider. In the implementations in which the service provider charges for use of the directory listings, there exists no mechanism to determine which listings are used by the customers. Consequently, the service provider has to compensate for all the directory listings, irrespective of use, resulting in over-compensation of the data providers. This approach may result in an unnecessarily high cost to the service provider, and thus, the customers. Also, inaccurate tracking can result in potential fraud, as the customer is in a position to easily deny retrieval of the listings.

Further, currently on-line directory services lack comprehensive information about a particular party. With the information explosion, individuals in today's modern society can be reached via many other means than the conventional land-line telephone directory number. For example, these individuals possess numerous contact information, such as e-mail addresses, URLs (Uniform Resource Locator) information (i.e., web site), cellular telephone number, facsimile number, pager number, post office addresses, etc. Such comprehensive information is expensive to maintain, particularly, if the service provider cannot adequately track usage of the information; the cost of subscribing to the database of the data provider would be cost prohibitive for the service provider. Moreover, data integrity poses a challenge as such contact information necessitates continual updating.

Based on the foregoing, there is a clear need for improved approaches for providing directory services on-line. There is also a need to accurately track use of the directory listings. In addition, there is a need to provide directory services to customers cost-effectively. There is also a need to minimize development and implementation costs. Therefore, an approach for providing retrieval of information which can be tracked and maintained cost-effectively is highly desirable.

SUMMARY OF THE INVENTION

The present invention addresses the above stated needs by providing a directory assistance system that enables the customer to access and to maintain customizable data in the directory database beyond the basic content of name, address, and directory (i.e., telephone) number. The customer may retrieve directory listings using a web-based interface (i.e., web browser, pager, personal digital assistant (PDA), non-personal computer devices, etc.) to submit queries and receive corresponding results.

According to one aspect of the invention, a method providing directory assistance services over a packet switched network. The method includes receiving a request message from an access device for information. The method also includes forwarding the information to the access device in response to the request message, wherein the information includes basic content data and optional enhanced content data. The information is stored in a database that is remotely located from the access device. The method further includes selectively receiving a modification message to modify the enhanced content data associated with the information from the access device, and updating the database based upon the step of selectively receiving. The above arrangement advantageously provides accurate usage tracking of the desired information.

According to another aspect of the invention, a server for providing directory assistance services over a packet switched network is disclosed. The server includes a communication interface that is configured to receive a request message from an access device for information. The server also includes a processor coupled to the communication interface and configured to forward the information to the access device in response to the request message, wherein the information includes basic content data and optional enhanced content data. The information is stored in a database that is remotely located from the access device, wherein the processor selectively receives a modification message to modify the enhanced content data associated with the information from the access device. The processor instructs the update of the database based upon the modification message. This arrangement advantageously provides a cost-effective mechanism for obtaining directory listings.

According to another aspect of the invention, a server for providing information over a packet switched network is disclosed. The server includes means for receiving a request message from an access device for information, and means for forwarding the information to the access device in response to the request message, wherein the information includes basic content data and optional enhanced content data. The information is stored in a database that is remotely located from the access device. The server also includes means for selectively receiving a modification message to modify the enhanced content data associated with the information from the access device, and means for updating the database based upon the modification message. This arrangement advantageously minimizes fraud, in that accurate tracking of the actual listings that are retrieved can be performed.

According to one aspect of the invention, an on-line directory assistance service system includes a server that is configured to receive a request message for information over a packet switched network from an access device. The server is configured to forward the information to the access device in response to the request message, wherein the information includes basic content data and optional enhanced content data. The system also includes a database that is coupled to the server and is configured to store the information. The server is further configured to selectively receive a modification message to modify the enhanced content data associated with the information from the access device, and to update the database based upon the modification message. Under this approach, a customer may obtain directory assistance cost-effectively.

In another aspect of the invention, a computer-readable medium carrying one or more sequences of one or more instructions for providing directory assistance services over a packet switched network is disclosed. The one or more sequences of one or more instructions include instructions which, when executed by one or more processors, cause the one or more processors to perform the steps receiving a request message from an access device for information, and forwarding the information to the access device in response to the request message, wherein the information includes basic content data and optional enhanced content data. The information is stored in a database that is remotely located from the access device. Other steps include selectively receiving a modification message to modify the enhanced content data associated with the information from the access device; and updating the database based upon the step of selectively receiving. This approach advantageously permits accurate accounting and billing for directory assistance services.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is diagram of an enhanced content data entry screen of a GUI, in accordance with an embodiment of the present invention.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to directory assistance services over the Internet and intranets, it is recognized that the information retrieval mechanism may be used for any type of information over any packet switched network.

Figure 1:
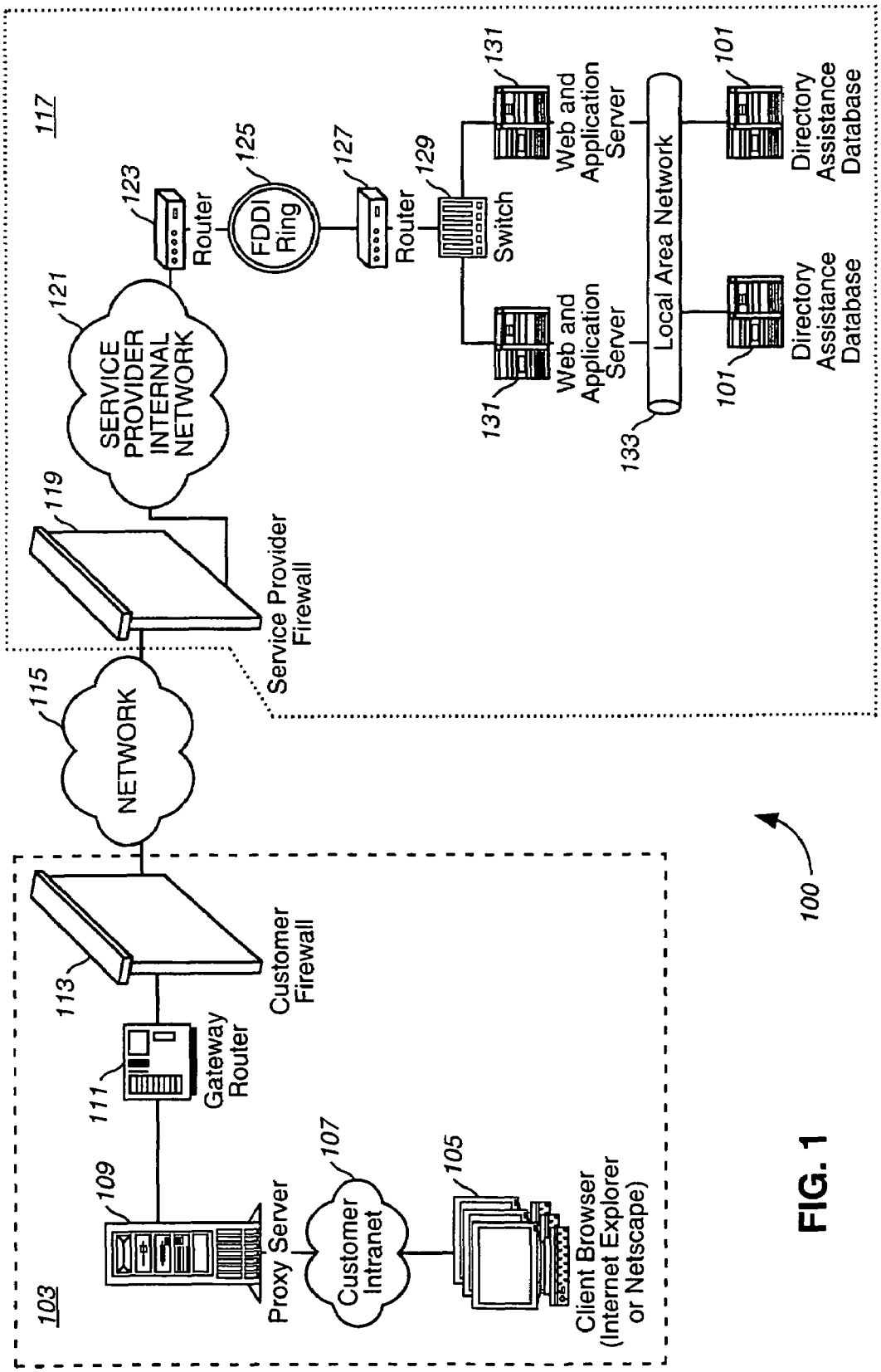
FIG. 1 is a diagram of the architecture of a communications system capable of providing directory assistance services, in accordance with an embodiment of the present invention.

FIG. 1 is a diagram of the architecture of a communications system capable of providing directory assistance services, in accordance with an embodiment of the present invention. Communication system 100 provides web-based access to a directory assistance database 101 of a service provider. It should be noted that the directory assistance database 101 is shown as multiple physical databases; however, it is recognized that a single physical database may be employed. In this exemplary embodiment, a customer, such as a corporate entity, may retrieve directory listings stored within the directory assistance database 101 through the customer's network 103, which includes access devices (e.g., client stations) 105 that connect to a corporate intranet 107. The access devices 105, in addition to a personal computer, may include any device that is capable of initiating a query and retrieving information from database 101, such as a personal (PC), a PDA (personal digital assistant), a web-appliance, an e-mail client, a web-enabled cell phone, and non-PC (personal computer) device. The client stations 105 are configured with web-browsers, supporting the Hypertext Transfer Protocol (HTTP). Hypertext Transfer Protocol (HTTP) is an application-level protocol for distributed, collaborative, hypermedia information systems and is more fully described in the Internet Engineering Task Force (IETF) RFC 2616, which is incorporated herein by reference in its entirety. To communicate externally, the customer network 103 utilizes a proxy server 109 that communicates to a gateway router 111. Additionally, a firewall 113 provides security for the customer network 103 for the connection to an external network 115; although the firewall 113 is shown as a separate component, the firewall 113 may be alternatively be provided by the gateway router 111.

The external network 115 may be provided by a carrier to establish connectivity between the customer network 103 and the network 117 of the service provider. The external network 115 may be implemented according to any number of technologies: Asynchronous Transfer Mode (ATM), frame relay, and secure IP (Internet Protocol); additionally, the network 115 may be a circuit switched network (e.g., T1, T3, etc.). As seen in FIG. 1, the network 117 similarly employs a firewall 119 to prevent network intrusion from a source outside of network 117. An internal network 121 attaches to a router 123, which in turn connects to a Fiber Distributed Data Interface (FDDI) ring network 125; it is recognized by one of ordinary skill in the art that any high-speed network may be utilized.

The FDDI ring network 125 provides a high-speed transport mechanism between router 123 and another router 127, which in turn connects to a switch 129. The switch 129 processes traffic from web and application servers 131. A local area network 133, such as an Ethernet network, permits the web and application servers 131 to communicate with the directory assistance databases 101.

The system 100 allows business customers, for example, to access residential, business or government phone listings electronically from their corporate intranets 107. Alternatively, the customer may employ other mechanisms to access directory information that are stored in the directory assistance databases 101; these other access mechanisms may include a PC, a PDA, a web-appliance, an e-mail client, a web-enabled cell phone, and non-PC device. In this exemplary embodiment, the customer utilizes a client browser 105 to submit a request (or information query) to a web and application server 131, which returns a result based upon the information that is stored within the directory assistance databases 101. The graphical user interface (GUI) associated with the client browsers 105 is shown in FIGS. 4-6. That is, directory assistance database 101 may store information that is acquired from local exchange carriers (LECs), Regional Bell Operating Companies (RBOCs), and third party proprietary databases. Directory assistance listings are normally purchased by the service provider from such data providers. Database 101, according to one embodiment of the present invention, contains basic listing information: name, directory number, and address. To compensate these data providers accurately, it is necessary to keep track of accessed and viewed listings.

The result of the request may be a set of zero or more listings with information that is partially hidden, which in an exemplary embodiment, is the phone (i.e., directory) number. As more fully discussed below, partially hiding information allows the customer to determine which one of the listings the customer would like to view, and thereby, forces the customer to "select" the desired listing. The hidden information associated with the selected listing is subsequently made visible. This selection is tracked by the system 100. In particular, selecting a listing causes information about the listing to being stored by the service provider for subsequent back-end processing, such as billing, reporting, and compensation to third party data providers.

The directory assistance services of system 100 possess a number of value-added services and capabilities. Unlike conventional directory assistance, system 100 permits the retrieval of information beyond that of name and telephone number. The information, according to one embodiment of the present invention, may be classified as basic content or enhanced content. Databases 101 may store an enhanced listing that includes, for example, e-mail addresses, a mobile number, a voice mail number, a URL, etc., in addition to the basic content of name, directory number, and address. A feature of the directory assistance service of system 100 is the ability to permit the customers, with respect to the enhanced content, to add, delete, or change (i.e., modify in some manner) the information. System 100 also provides sophisticated query capabilities (e.g., similar spellings, sounds like, etc.). Accordingly, system 100 significantly reduces a customer's directory assistance cost over the conventional voice access mechanism by providing a web-based interface to directory information for the users to easily, efficiently, and accurately obtain directory listings.

The on-line directory assistance service is also supported by a call center (not shown). The call center may provide a web-based text chat capability to answer questions that the customers may have, in addition to communication via telephone in the event that the customer elects to confer with the operator via the phone.

Additionally, system 100 supports a variety of billing methods for the directory assistance service: Transactional (Event) Based Fee, Per Seat (or Per User), Flat Rate Fee, Volume Based Fee, and a combination thereof. In the transaction based fee arrangement, the customer is charged a certain amount for each online directory assistance lookup that is performed, or is charged for the number of listings successfully accessed and viewed for each search. This fee is independent of the number of directory assistance queries that are performed during any time period, with the exception of queries that exceed thresholds that are previously agreed upon between the service provider and the customer. For example, if a customer consistently performs 20,000 queries per day, and then performs 50,000 queries another day (i.e., agreed threshold), then incremental billing may take into effect for that customer. The customer may be charged a flat fee or incremental transaction fee for the incremental queries (30,000 in this example) that exceed an agreed upon average number of queries during a time period. The directory assistance services also support billing and invoicing based upon a categorization of the user or entity within a company (i.e., customer); i.e., IP address, company location or the entire company.

The per seat charge method calculates a fee based upon the number of users. In the flat rate fee, the customer is charged a one-time fee for all online directory assistance queries that are performed over the life of the contract with the customer. The company is charged a flat rate fee for all online directory assistance queries that are performed during a particular time period, which may be daily, weekly, monthly, quarterly or yearly. The fee is independent of the number of transactions with the exception of queries that exceed thresholds agreed upon between service provider and the customer.

As regards the volume based fee, the customer is charged a predetermined amount for a certain number of directory assistance look-ups within a defined range for particular time period, in which overage may be assessed a different fee. Lastly, any combination of the above methods can be employed. The system 100 provides the customers with the ability to view the billing invoice online, and to have their bills delivered to them via various mechanisms: e-mail, fax, and etc.

System 100 provides secure access to the directory assistance databases 101 and associated applications. In particular, the system 100 supports authentication and authorization of the directory assistance capabilities; authorization is granular to the level of content within the databases 101 (i.e., varying levels of private data and public data). Commercial customers and third party developers are provided with secured access to the directory assistance data (basic and enhanced content). It is noted that any content that is specific to a customer is only accessible by that customer that owns that data.

Furthermore, system 100 provides a rich set of reporting functionalities. Reports may be prepared for any time period: daily, weekly and monthly. One report may represent the number of page views for each page on the portal or web site. Another report may reveal the number of access to the directory assistance database 101 (transactions) by customer (and third party developers). The system 100 may generate a report that shows the actions that were performed on each page; for example, the total number of click throughs for customer service. Additionally, the reports may be tailored for each customer. As earlier noted, these reports may be generated and displayed through the web browser.

Figure 2:
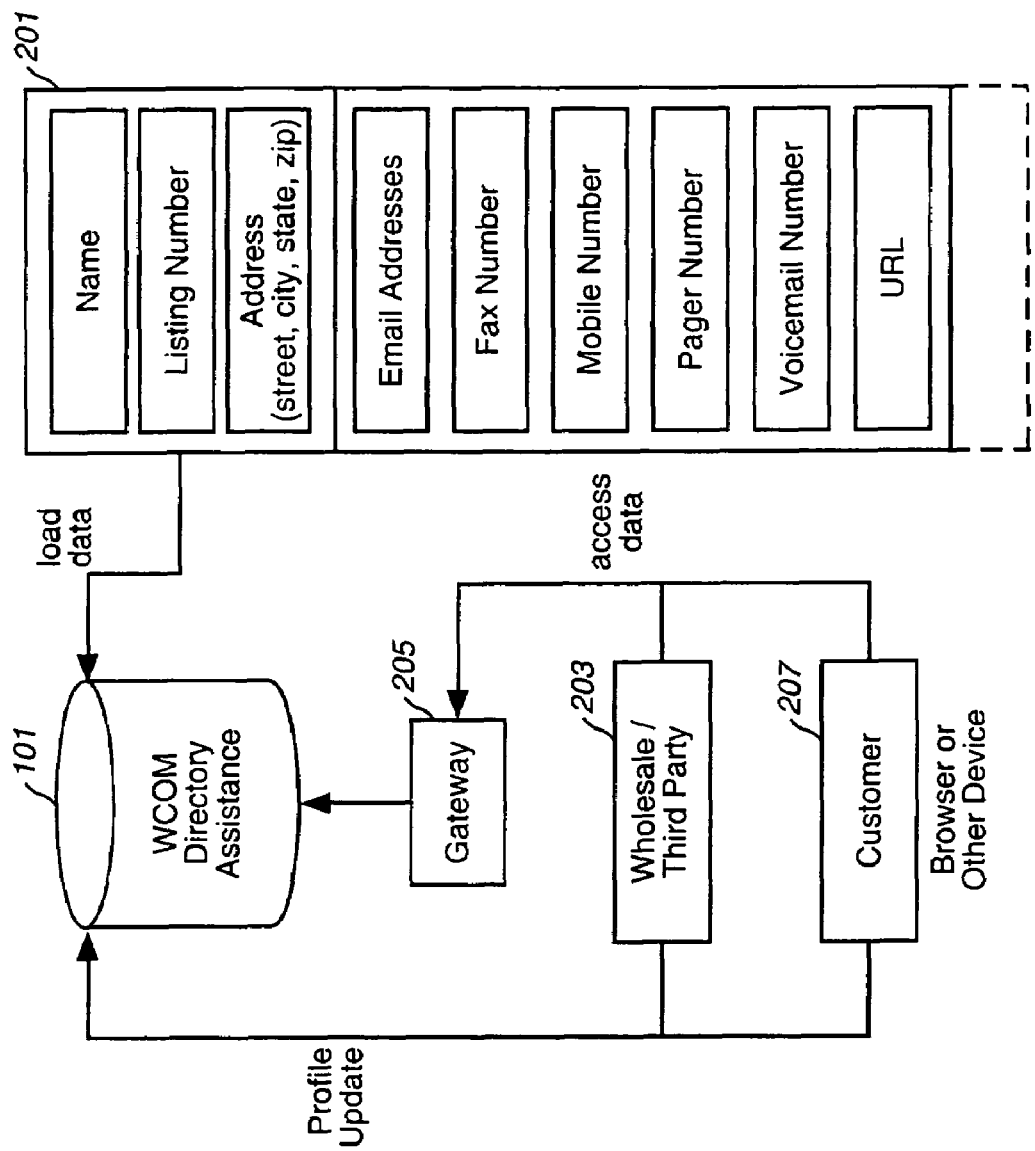
FIG. 2 is a diagram of a database that stores directory assistance information, in accordance with an embodiment of the present invention.

FIG. 2 is a diagram of a database that stores directory assistance information, in accordance with an embodiment of the present invention. As shown in FIG. 2, the directory assistance database 101 may upload the data from a third party data provider 203 via a gateway 205. A customer 207, therefore, is able to access directory information stored within directory assistance database 101 through the use of a browser on a client station 105 (FIG. 1) or some other access device, such as a PDA, web-appliance, an e-mail client, web-enabled cell phone, or any non-PC device. Directory assistance database 101 contains multiple directory listings, in which each listing 201 (or directory) may include the following basic fields: a name field, a listing number field, and an address field. The listing number field, in an exemplary embodiment, specifies a land-line telephone number. Database 101 may also store enhanced fields (i.e., enhanced content) that may be tailored to the particular needs of the customers; according to one embodiment of the present invention, these enhanced fields include the following: one or more e-mail address fields, a fax number field, a mobile number field, pager number field, a voice-mail number field, and a URL field. According to one embodiment of the present invention, the customer is able to maintain the enhanced content.

Database 101 is extensible to allow for integration or association with enhanced content in other databases (not shown). Further, the directory assistance services afford the customer the functionality to add new content, delete content, or change the enhanced content. The mechanism for modifying the enhanced data (e.g., e-mail addresses, fax number, mobile number, pager number, voice-mail number, and URL) includes the web browser 105, as well as other access devices (e.g., PDAs, cellular phones, web appliances, and etc.). The basic content of the directory assistance data is modified by the service provider.

As previously mentioned, the system 100 may be used to manage other types of information with other applications, beyond that of directory assistance data. The system 100, for example, permits commercial customers and third party developers to integrate the directory assistance services into their environment, or have the ability to easily access the directory assistance services data from their intranet. This integration is supported by a Software Development Toolkit (SDK), without requiring extensive systems integration or development effort. Also, commercial customers have the capability to create a link from their intranet into the directory assistance platform.

As stated, system 100 can be adapted to a variety of different applications that are separate or supplemental to the directory assistance services. One application of system 100 is the management of credit cards, whereby the service provider enables the customers to manage a list of credit cards securely. This list of credit cards may be used to notify the corresponding credit card companies in the event that any one of the cards is lost or stolen. The system 100 may also enable users to select a notification method when someone queries their listing. For example, a customer is paged when someone requests the customer's directory assistance listing. Additionally, the database 101 may store demographic information that is tied to the individual listings. Further, the system 100 may provide password authentication and authorization services.

The above directory assistance database 101, in conjunction with the web and application server 131, provides numerous advantages over the conventional on-line directory service systems. Database 101 supports comprehensive content on an individual or business for the customers. The directory service, according to one embodiment of the present invention, maintains high data accuracy, in part, through the continual updating of directory listings, which are provided by the third party data providers (e.g., LECs and RBOCs), as well as the source of the data. In an exemplary embodiment, the directory service of system 100 obtains a majority of the data (over 99%) directly from the RBOCs via a daily feed; RBOC data is considered an accurate source for directory listing data. Conventional online directory listing data providers obtain their data typically every 30-90 days from data sources that are non-RBOC sources. These data sources rely on manual entry or scanning of data into their databases, which has a high probability for error. By contrast, the system 100 utilizes automation (e.g., electronic data interchange) to obtain the data. Because of their data updating methods, the non-RBOC data sources are typically 90 days or more out-of-date, from an accuracy standpoint; accordingly, data integrity is compromised under the conventional approach. From the service provider perspective, the implementation of the directory assistance service provides a new revenue source with minimal hardware/software modifications to the existing directory assistance architecture of the voice access system.

Figure 3:
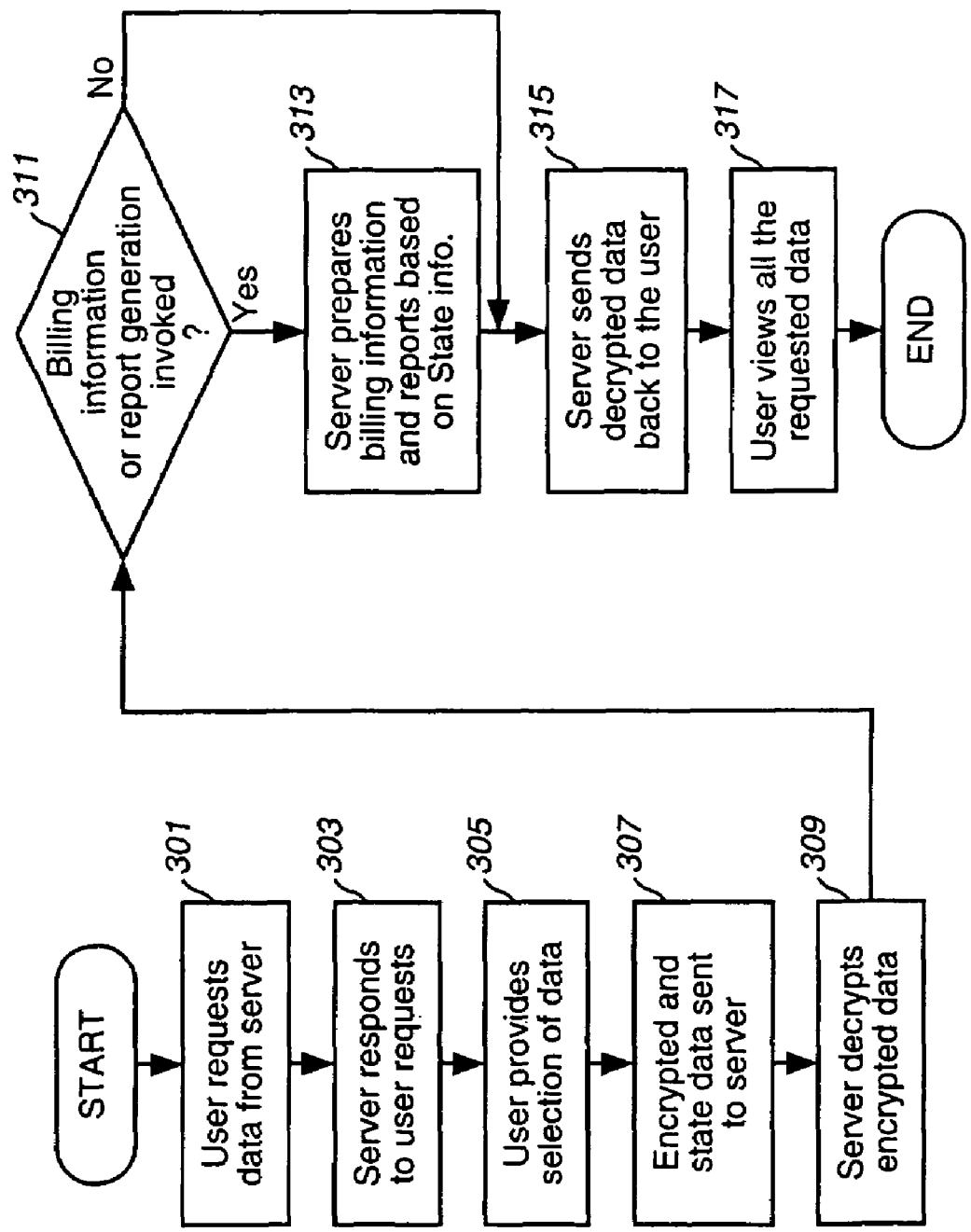
FIG. 3 is a flow chart of a process for retrieving information, in accordance with an embodiment of the present invention.

FIG. 3 is a flow chart of a process for retrieving information, in accordance with an embodiment of the present invention. In general, the concept of information retrieval, according to the present, is to permit the customer to select the desired information based upon viewing a portion of the information. The capability to view the information partially allows the customer to retrieve accurate data that is reflective of the customer's, and to pay for only those selected directory listings that are actually used. In this manner, the third party data provider is only compensated for the listings that are accessed and viewed by the customer. In step 301, a user requests information from the web and application server 131 via client browser 105. The web and application server 131 responds to the user request, as in step 303, by generating a response message that contains one or more rows of directory listings. The user may be limited to a predetermined maximum number of records/entries (i.e., rows) that are returned in the results of the online request (i.e., directory assistance query).

Within the response message, there are four types of data, wherein any number of each type of data exists in each row: viewable data, hidden data, encrypted data, and state data. Viewable data is directly viewable by the user through the client browser 105. Hidden data provides a place holder for information that can be displayed; for example, the information is masked by characters that indicate that the true information is not shown, e.g., "XXXXXX". Each block of hidden data has a corresponding encrypted block (i.e., hidden data), which is not directly viewable by the user. Lastly, state data relating to billing and reporting capabilities refer to information that is passed back to the user, and subsequently forwarded to the web and application server 131 upon selection of a row; state data need not be maintained by the server 131. The state information may be stored in the client stations that are running the client browsers 105.

In step 305, the user is presented with one or more rows of listings from database 101 correspond to the request and selects the desired listing. The user views the viewable and hidden data and determines which row corresponds to the listing that the user seeks. The method of selection depends on the particular type of user interface being used. The user selects a particular row of information. In the specific case of a web browser as the user interface (as shown below in FIGS. 4 and 5), a combination of viewable and hidden data is sent back to the user as an "anchor" (URL, or link), that can be "clicked".

Thereafter, upon selection of the desired row, the client browser 105 transmits encrypted data and state data to the web and application server 131, per step 307. It should be noted that the selection of listing process is generic and could be used in any system requiring server stateless selection capability. Next, in step 309, the server decrypts the encrypted data. At this point, if the billing and reporting functions are invoked (step 311) by an external process, for example, then the web and application server 131 prepares the billing information and the reports based upon the state data, per step 313. In step 315, the server 131 sends the decrypted data back to the client browser 105. The user can now view the entire row of data (step 317). It is this selected row that the customer is charged and upon which the data provider is compensated.

The above process is executed through a series of web pages; the GUI, according to an embodiment of the present invention, enables the user to navigate between the various web pages by clicking on the corresponding links. These web pages are discussed below.

FIGS. 4A-4D show GUI screens relating to residential directory listings, in accordance with an embodiment of the present invention. To retrieve a residential listing, a user via client browser 105 is presented with a residential search screen 400, shown in FIG. 4A. Screen 400 lists all of the available searches as links: a Residential Search link 401, a Business/Government search link 403, and a Reverse Search link 405. Because screen 400 is in fact the residential search page, the Residential Search link 401 is disabled. However, the user can easily navigate to a business/government search page by clicking on the Business/Government search link 403 if the user desires to obtain information about an individual or organization associated with a business organization or a government entity; the business/government search page is described further with respect to FIGS. 5A-5C. The residential search page (i.e., screen 400), in an exemplary embodiment, serves as the default screen (or page) that is first displayed by the client browser 105. The Reverse Search link 405 directs the user to a reverse search page in which the user may perform a search to determine the name and address of the party or organization by inputting the 10-digit telephone number; this reverse search capability is more fully discussed in FIGS. 6A and 6B.

Screen 400 contains a Feedback link 407 to a feedback page that permits the user to comment on the directory assistance service so that the service provider can make future enhancements to the service. A Help link 409 is also provided to assist the user by supplying information and tutorials on the functional capabilities of the directory assistance service application. Upon clicking on the Help link 409 by the user, the client browser 105 displays a separate window that contains, for example, Frequently Asked Questions (FAQs) instructions.

To perform a search for a residential listing, the user is provided with a number of text boxes corresponding to name and address information, as enumerated in Table 1, below. That is, these text boxes (i.e., fields) constitute the input search criteria. A Last Name box 411 permits the user to enter the last name of the party that is the subject of the search; according to one embodiment of the present invention, this Last Name box 411 may be specified as a required field. That is, the search cannot proceed until the user enters information in box 411. A First Name box 413 is also provided to narrow the search. If the user has information about the address of the party, then the user may enter any or all of the address information into the following address boxes: Street Name box 415 specifying the street name of the address, a City box 417, and a State box 419. State box 419, in this exemplary embodiment, has a pull-down menu for the states to minimize typing. Screen 400 further provides an Area Code box 421 for entry of an area code, if known. It is noted that unless a box is indicated as being "required" in some manner, it is an optional box. For instance, all required fields may be marked with an asterisks (*) and a note that indicates that these asterisked fields are required.

Searches are performed based on the entered information. These searches are conducted by the web and application server 131, which examines records that match the entered information (i.e., element), such that at least the record element field starts with the specific element information that was entered.

TABLE 1

| Data Element | Description | Required Input? | Validations (If Element is entered.) |
| --- | --- | --- | --- |
| Last Name | Last name of the directory assistance listing | Yes | At least one character in length Alphabetic |
| First Name | First name of the directory assistance listing | No | Alphabetic |
| Address | Address (Street only - not house number) of the listing | No | Alphanumeric |
| City | City of the directory assistance listing | No | Alphabetic |

TABLE 1-continued

| Data Element | Description | Required Input? | Validations (If Element is entered.) |
|---|---|---|---|
| State | State of the directory assistance listing | No | Pull-down display |
| Area Code (NPA) | Area Code (NPA) of the directory assistance listing | No | 3 digits numeric |

Figure 4A:
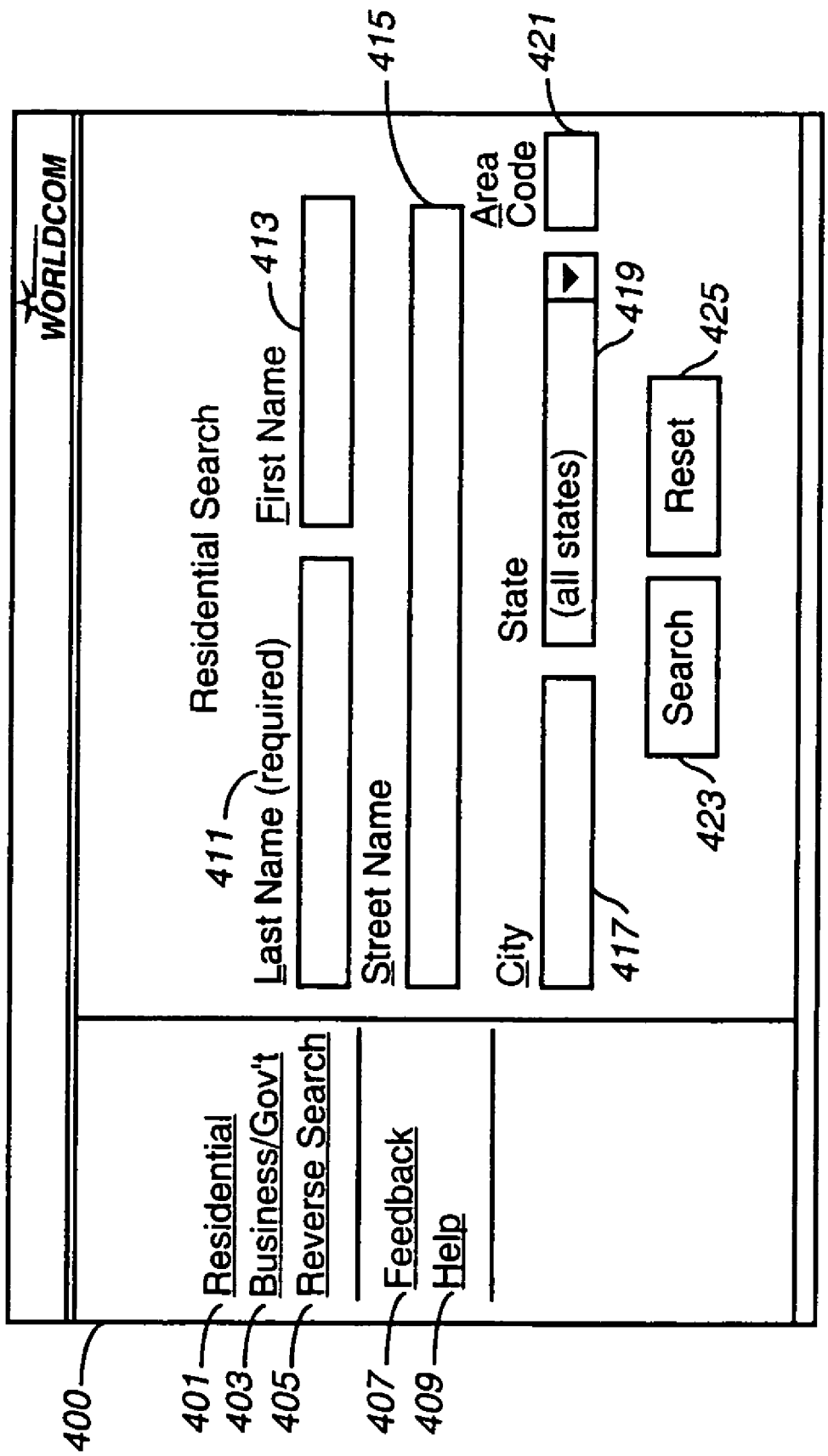
FIGS. 4A-4D are diagrams of screens relating to residential directory listings of a graphical user interface (GUI) used in the system of FIG. 1, in accordance with an embodiment of the present invention.
Figure 4B:
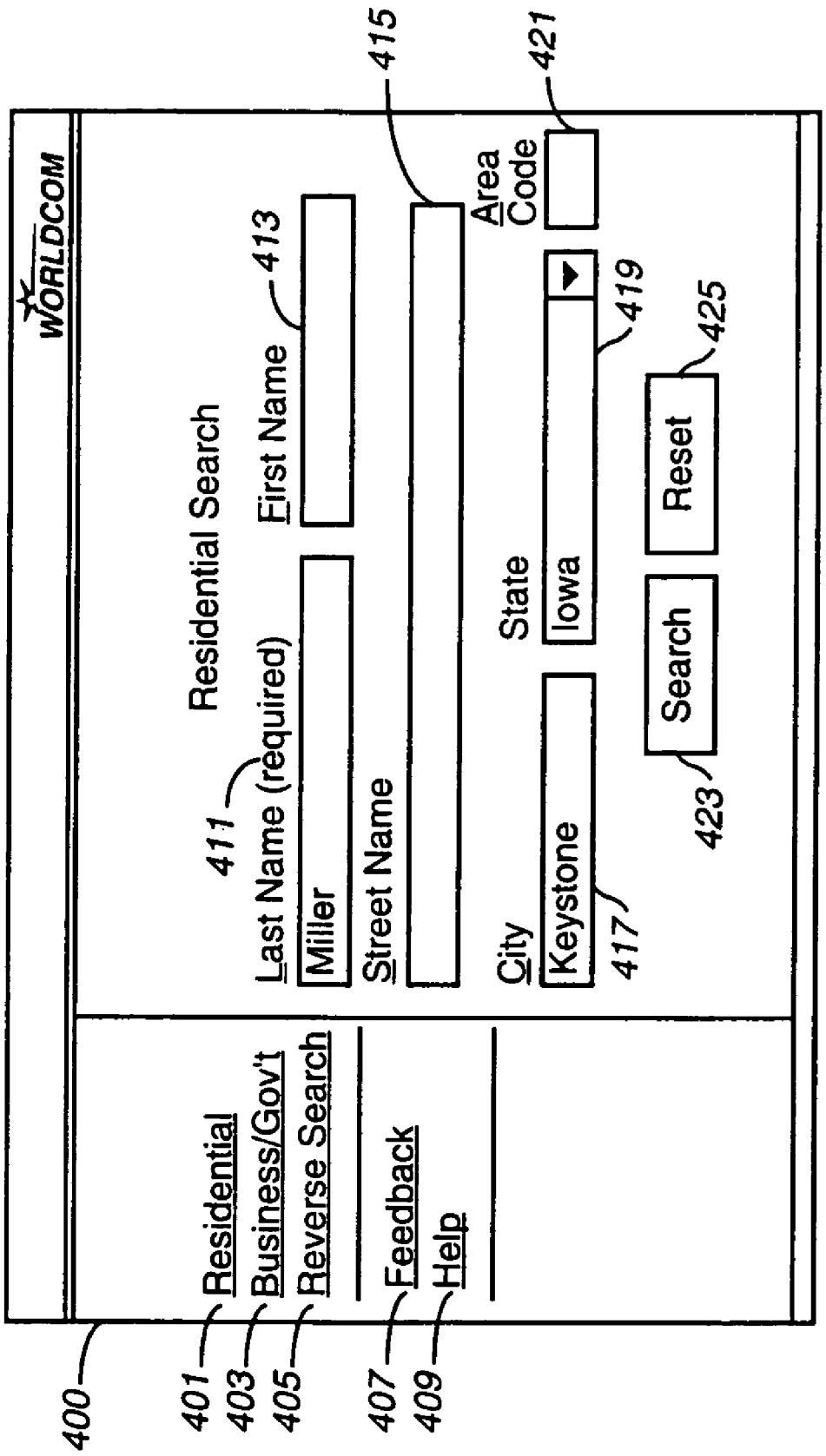

FIG. 4B shows an exemplary entry, in which the user has knowledge of only the last name and the city and state of the subject party; in this case, the user initiates a query for a person with the last name of "Miller" residing in Keystone, IA. Upon entering as much information as is available to the user, the user may launch the search by clicking on a Search button 423. A Reset button 425 exists to clear the text from all of the boxes. To help the user with the entry of information via screen 400, a number of error messages relating to the residential searches are provided. For example, if at least one character is not entered into the Last Name field 411, an error message is displayed in an error pop-up window. Also, if the data entered into the Last Name field 411, a First Name field 413, a City field 417 are not alphabetic, an error message results. Further, if the data that are entered into the Area Code (NPA) 421 is not numeric or three digits in length, an error message is also provided in this instance.

Figure 4C:
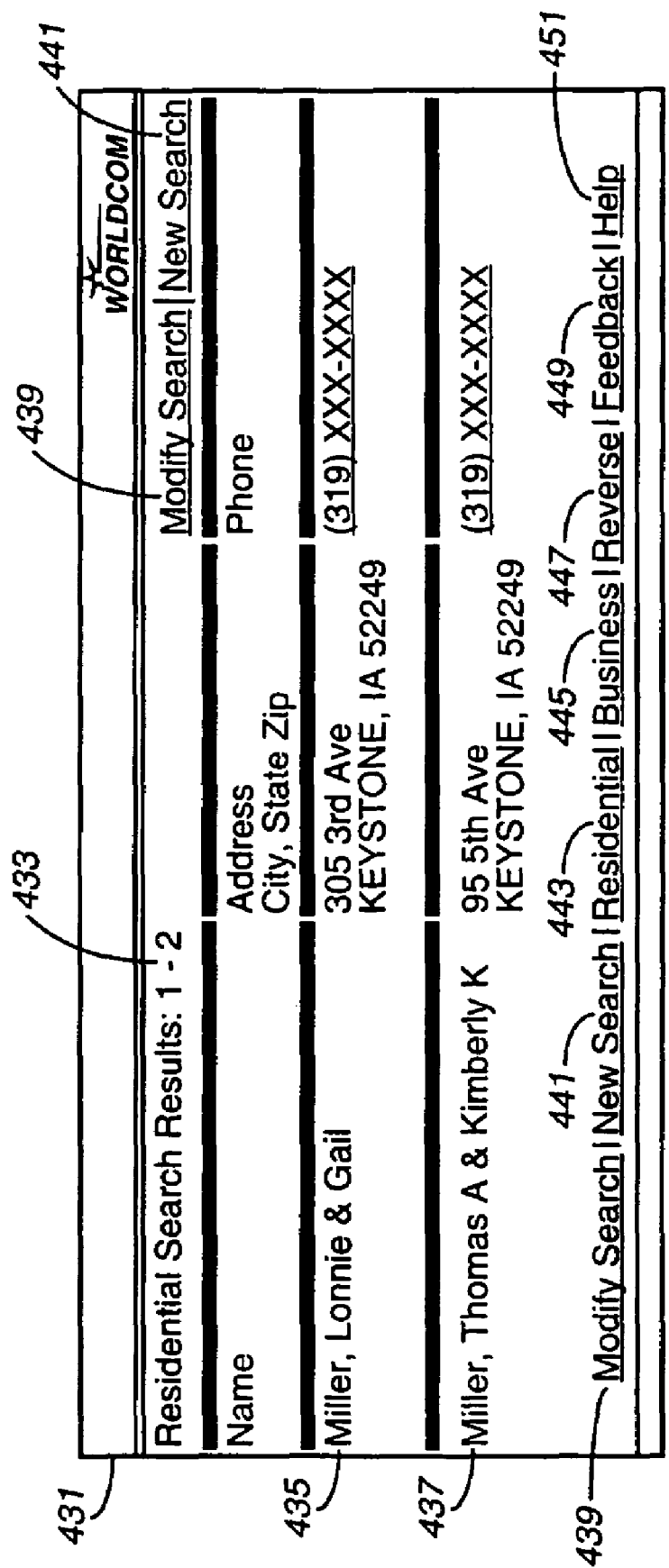

FIG. 4C shows a residential search result screen 431, according to one embodiment of the present invention. The data that is displayed in screen 431 in response to the query that was submitted by the user through screen 400 is listed below in Table 2.

TABLE 2

| Data Element | Description |
|---|---|
| Last Name | Last name of the directory assistance listing |
| First Name | First name of the directory assistance listing |
| Address | Address (Street and House number) of the listing |
| City | City of the directory assistance listing |
| State | State of the directory assistance listing |
| Zip | Zip code of the directory assistance listing |
| Area Code (NPA) | Area Code (NPA) of the directory assistance listing |
| Number | 7-digit number associated with the record's Area Code (NPA) |

In an exemplary embodiment, the results from this search are sorted in ascending by field values in the following hierarchy: Last Name field 411, First Name field 413, State field 419, City field 417, and Directory Number (Area code+telephone number). A search result number field 433 specifies the number of listings found for the query that was submitted by the user. In this example, the search for "Miller" yields two listings (or rows) 433 and 435, whereby the basic content of name, address, and the area code of the telephone number are provided. Rows 435 and 437 provide visible data in form of the name, and various portions of the address and telephone number (i.e., area code). The "XXXX" characters hide some of the data associated with the telephone number and the ZIP code of the address; the hidden data (e.g., telephone number beyond the area code) is not shown until the user selects the particular row. The purpose of the partial display of information is to ensure that the user is selecting the correct listing. The determination as to what is hidden data can be specified by the service provider; for example, the street number in the address fields of rows 435 and 437, respectively, may be hidden. In this example, the phone numbers in rows 433 and 435 are hidden data, as indicated by the "XXX-XXXX" characters. At this point, the user may be reminded of the correct party based upon the first names, full address information, and/or the area code; for instance, the user may vaguely remember that Lonnie and Gail are a couple. Consequently, the user may select the proper listing. In other words, to view a listing, the user selects the phone number of the listing that the user would like displayed, thereby minimizing the receipt of incorrect, and therefore, useless information. In this scenario, the phone number for Lonnie & Gail Miller is selected, in which the entire 10-digit phone number would subsequently be displayed.

Screen 431 includes a number of links to refine the search or conduct a new search. A Modify Search link 439 is supplied at the top of screen 431 as well as the bottom. The Modify Search link 439 directs the user to a search page that may enable the user to provide more information about the party; the prompts may take the form of the entry boxes of screen 400. By clicking on the Modify Search link 439, the user is presented with a search page to with the information previously keyed into the criteria boxes (i.e., fields) are displayed as well. In addition, a New Search link 441 permits the user to enter a new search.

Similar to screen 400, the residential search result screen 431 possesses a residential search link 443, a Business/Government Search link 445, a Reverse Search link 447, a Feedback link 449, and a Help link 451.

Figure 4D:
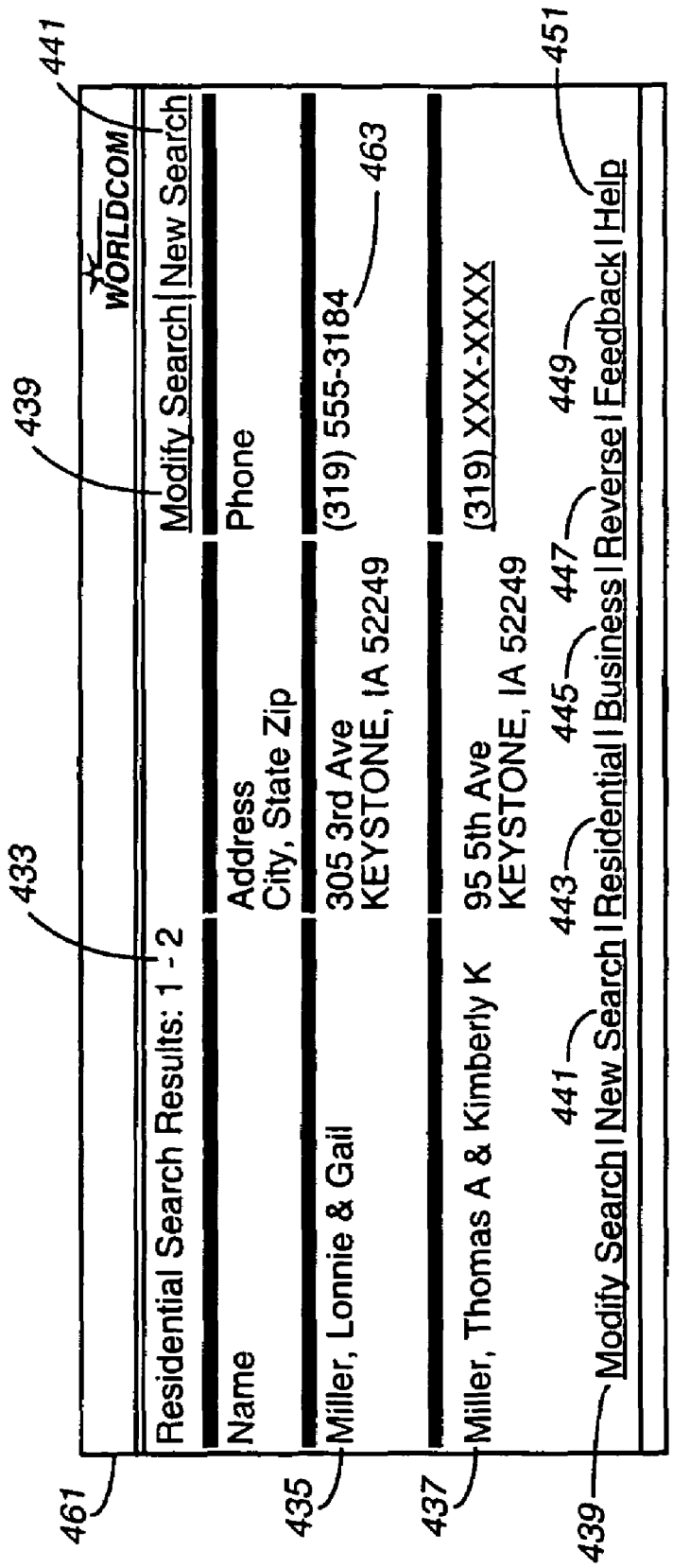

FIG. 4D shows a selected search result screen 461, wherein all of the information of the selected row are visible. In this example, the user has selected "Lonnie & Gail Miller" as the proper party back in screen 431. As a result, web and application server 131 provides the telephone number 463 as visible data in screen 461 of client browser 105; the new visible data corresponds to the hidden data.

For the purpose of explanation, the search screen 400 and associated result screens 431 and 461 are described with the basic content of the directory listing; that is, the listings convey the name, address, and directory number. The listings 435 and 437 show the basic content of the directory listings. Alternatively, the data selection screen 400 may supply the enhanced content (e.g., e-mail address, mobile number, fax number, pager number, voice-mail number, and URL).

Figure 5A:
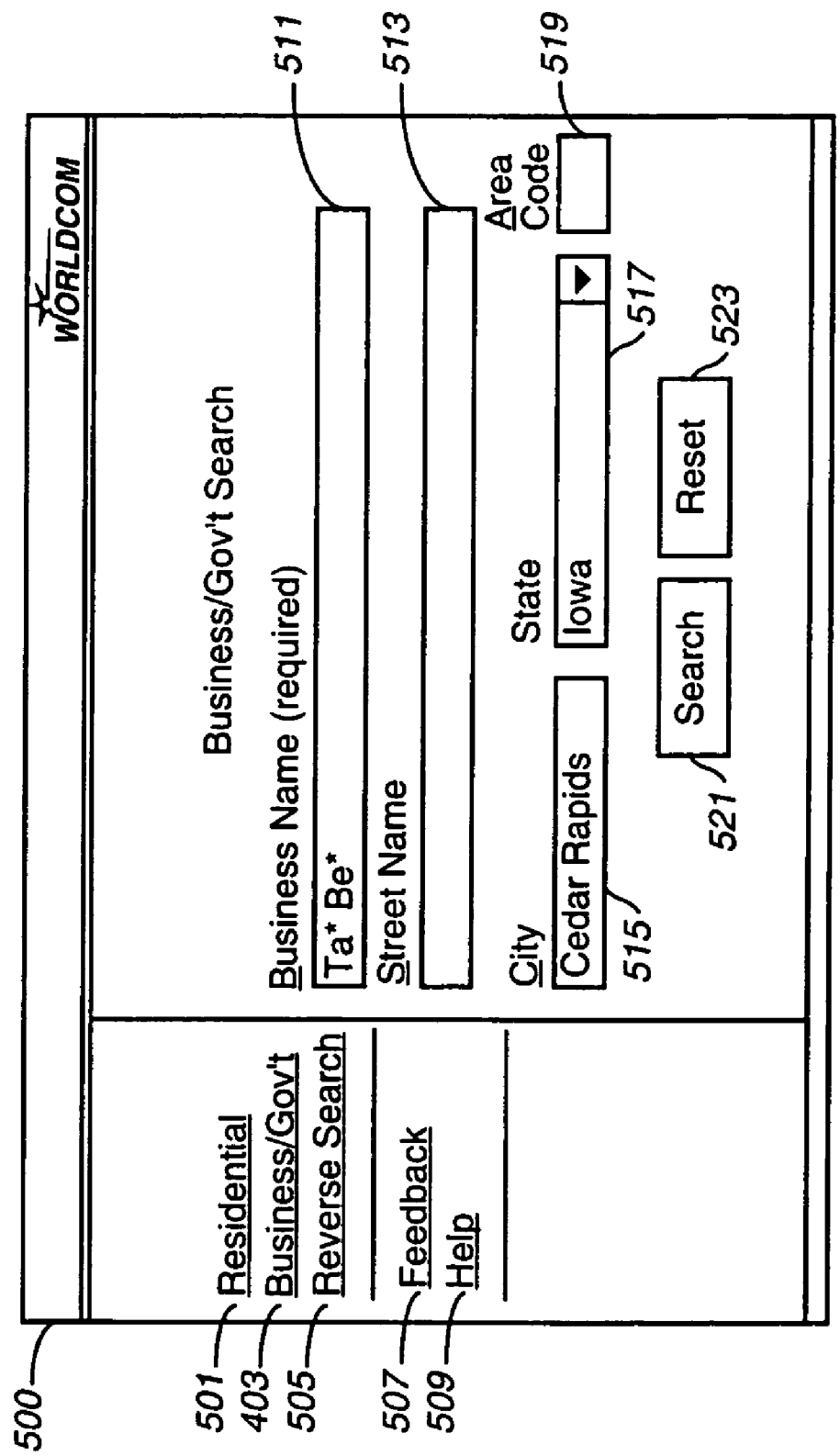
FIGS. 5A-5C are diagrams of screens relating to business/government directory listings of the graphical user interface (GUI) used in the system of FIG. 1, in accordance with an embodiment of the present invention.
Figure 5B:
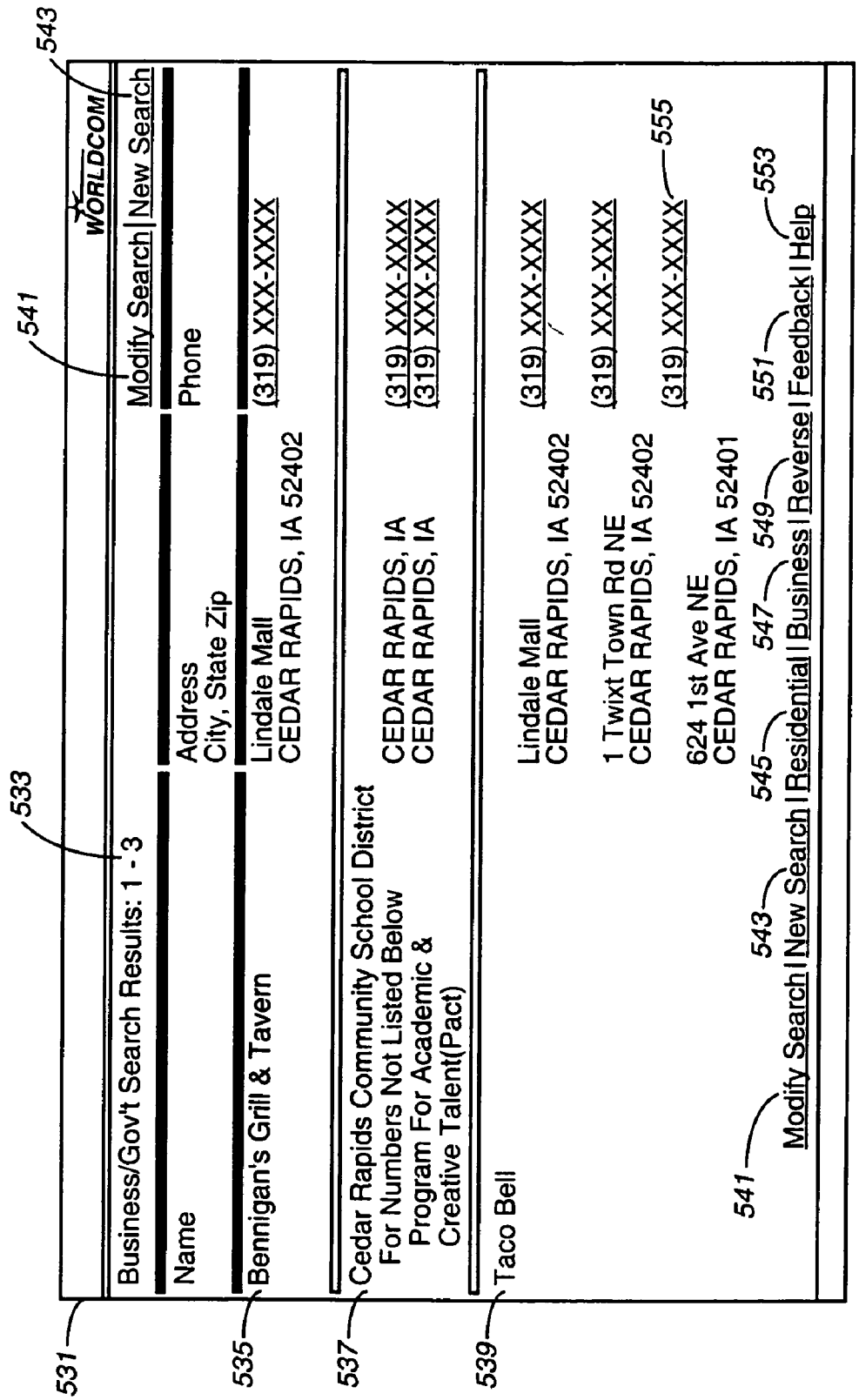
Figure 5C:
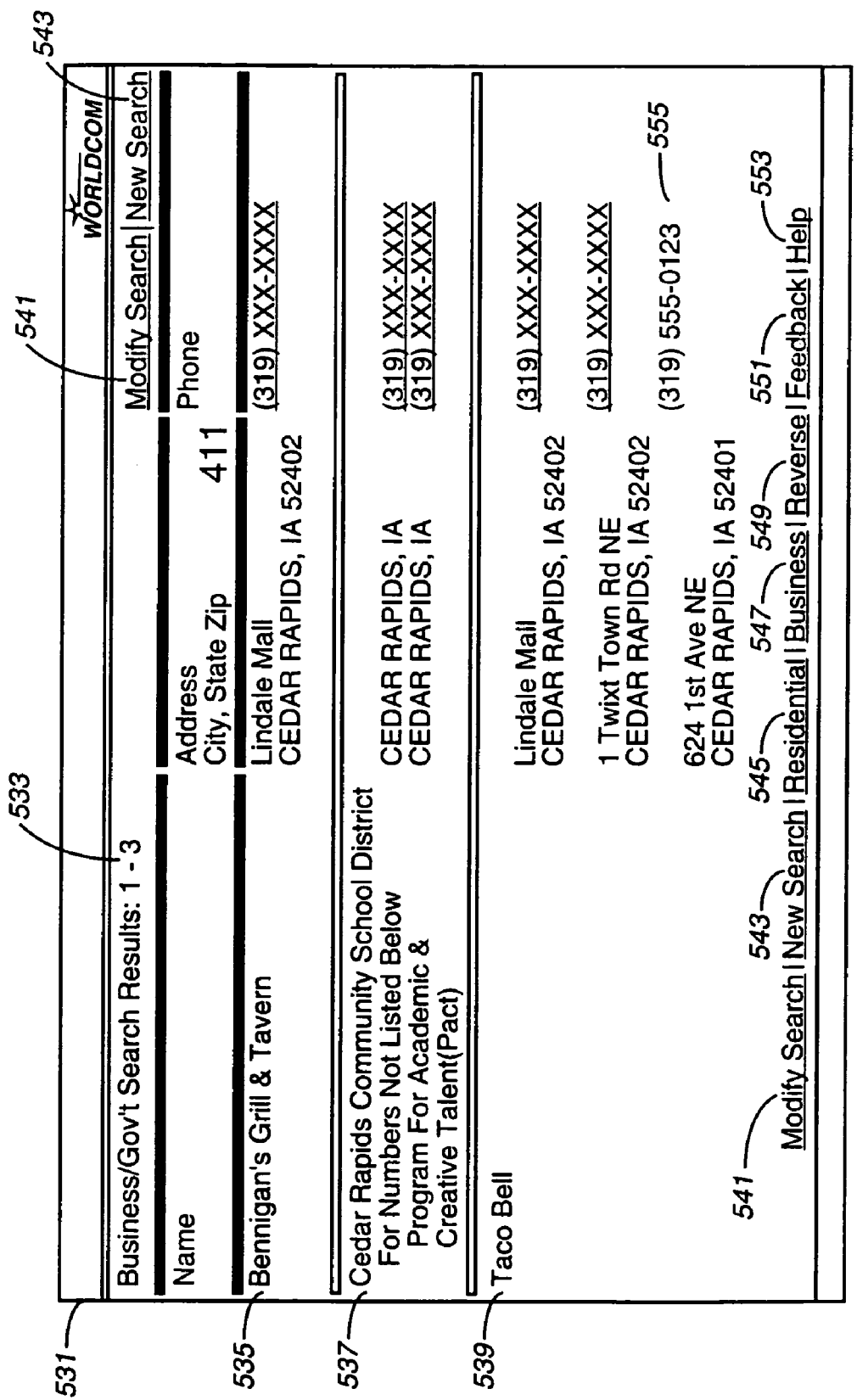

FIGS. 5A-5C show the GUI screens relating to business/government directory listings, in accordance with an embodiment of the present invention. To query for a business or government listing, the use may click on the Business/Government link 403 from the residential search screen 400. This link 403 accordingly directs the user to a business/government search screen 500, which possess similar navigational links as the residential search screen 400: a Residential search link 501, a Business/Government link 503, a Reverse Search link 503, a Feedback link 507, and a Help link 509. The business/government search screen 500 provides a similar entry format as that of residential search screen 400, and includes the following fields: a Business Name field 511, a Street Name field 513, a City field 515, a State field 517, and an Area Code field 519. The properties of these fields 511, 513, 515, 517, and 519 are enumerated in Table 3, below:

TABLE 3

| Data Element | Description | Required Input? | Validations (If Element is entered.) |
|---|---|---|---|
| Name | A part of the name of the directory assistance listing | Yes | At least one character in length Alphanumeric |
| Address | Address (Street only - not house number) of the listing | No | Alphanumeric |
| City | City of the directory assistance listing | No | Alphabetic |
| State | State of the directory assistance listing | No | Pull-down display |
| Area Code (NPA) | Area Code (NPA) of the directory assistance listing | No | 3 digits numeric |

Screen 500 also contains a Search button 521 and a Reset button 523 to submit the query and to clear the information in the fields, respectively.

In this example, the user knows only a few letters in the name of the business, and thus, may enter only those known letter, utilizing wild card characters to designate variable or unknown characters. In this example, the user only knows that the name of the business has a "Ta" and a "Be" in the name. Consequently, the entry into the required Business Name field 511 is "Ta*" and "Be*", wherein the asterisk represents wild card characters. At this point, the user may submit the query by clicking on the Search button 521. After processing this query, the web and application server 131 returns data to the client browser 105 via a business/government search result screen 531, as shown in FIG. 5B.

FIG. 5B has the same look-and-feel as that of the residential search result screen 431. A search result number field 533 indicates the number of listings the query yielded, which in this case is three. The three listings 535, 537, and 539 correspond to business names that satisfy the query: "Ta*" and "Be*". It is noted that each of the listings may have multiple locations, such as listing 537 and 539. Next, the user may click on the desired listing. If the results are not what the user seeks, then the user may modify the search by clicking on a Modify Search link 541 or start an entirely new search via a New Search link 543.

Further, screen 531 provides links that are similar to that of the search result screens 431 and 461: a residential search link 545, a Business/Government Search link 547, a Reverse Search link 549, a Feedback link 549, and a Help link 553.

Continuing with the example, it is assumed that the user is seeking a Taco Bell™ that is located on 624 1$^{st}$ Avenue, the user merely clicks on the desired field 555. In response to this selection input from the client browser 105, the web and application server 131 returns visible data corresponding to the selected row 539, as shown in FIG. 5C.

As evident from the discussion above, the selection process enables the service provider to compensate data providers based on which listings are accessed and viewed. By contrast, conventional directory systems do not readily permit charging of directory information, in part, because it may be difficult to track the listings that are selected by the customers.

In addition to performing queries to determine the telephone numbers of the residential party or business/government entity, the directory assistance services that are supported by the service provider's network 117 permits the retrieval of information based upon a telephone number (i.e., reverse search). This function is useful if the user does not recall the name of the party associated with the telephone number; for example, if the user writes down the telephone number, but not the name and later forgets, then the reverse search is of particular use. The reverse search is discussed below with respect to FIGS. 6A and 6B.

Figure 6A:
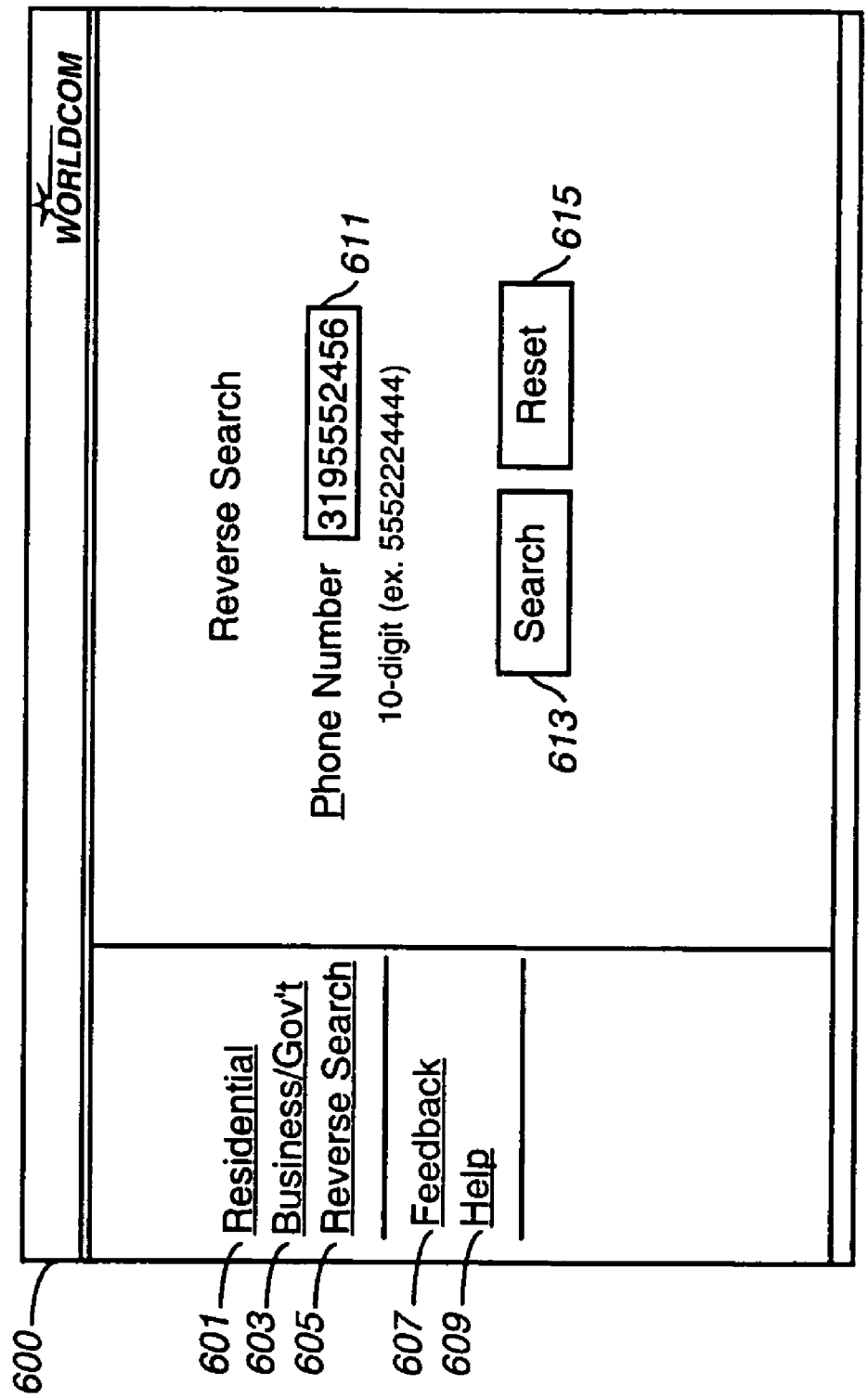
FIGS. 6A and 6B are diagrams of screens relating to reverse searching of the graphical user interface (GUI) used in the system of FIG. 1, in accordance with an embodiment of the present invention.
Figure 6B:
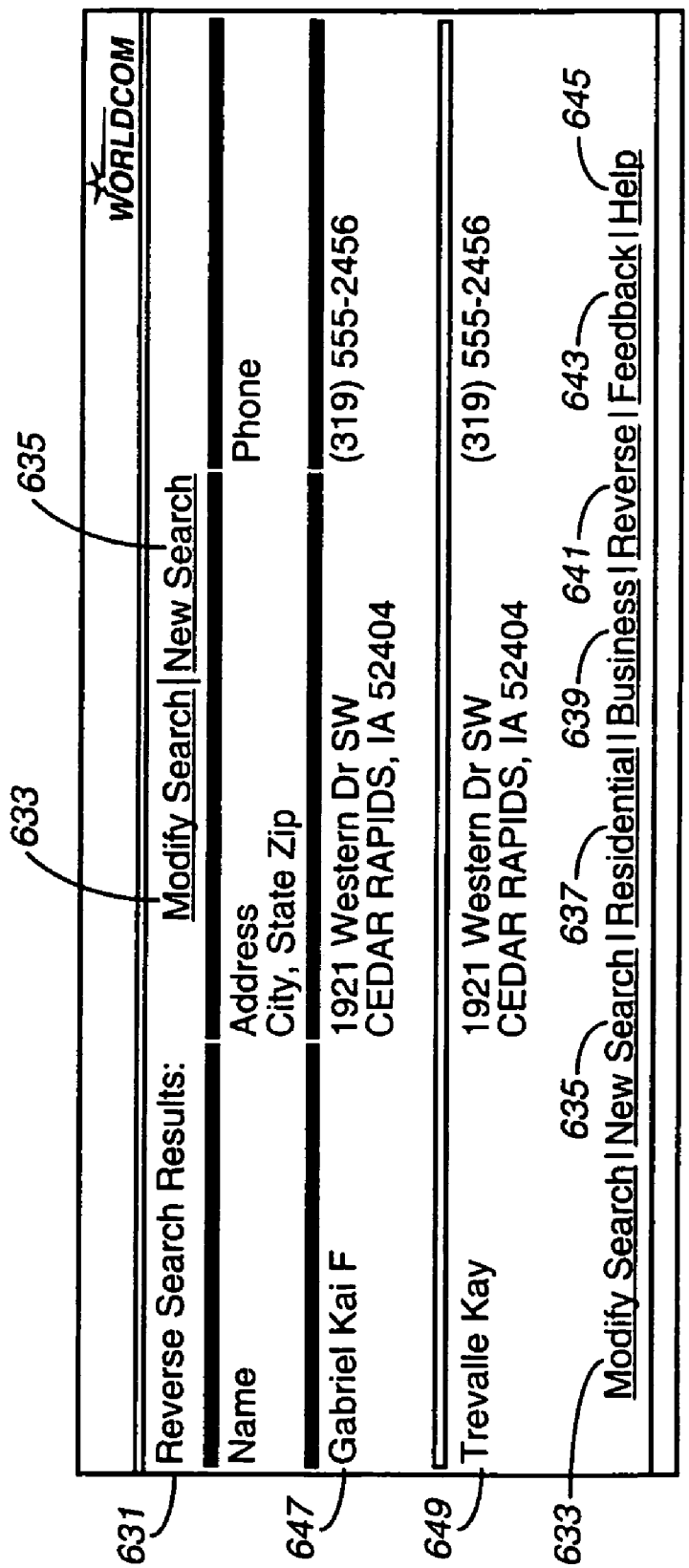

FIGS. 6A and 6B show the GUI screens relating to reverse searching, in accordance with an embodiment of the present invention. A reverse search may be initiated from any of the Reverse Search links; for example, links 405 and 505 of screens 400 and 500, respectively. Reverse Search screen 600 includes a Residential search link 601, a Business/Government link 603, a Reverse Search link 603, a Feedback link 607, and a Help link 609, which are common to screens 400 and 500 as well. The user enters the telephone number in a Phone Number field 611 and launches the query by clicking on a Search button 613. If the user enters an erroneous number, the user may clear the entry by using a Reset button 615.

The user is alerted with various error messages if the entry into the Phone Number field 611 is improper. For instance, if data is incomplete (e.g., the Area Code has been omitted), then an error message is displayed, as in a pop-up window. Also, if the entered data is not numeric, an error message indicating so is displayed. If the entry is proper, the web and application server 131 proceeds with processing the query, resulting in return of one or more listings, as shown in FIG. 6B.

FIG. 6B shows the reverse search result screen 631, which includes the links that are common to, for example, result screens 431 and 531: a Modify Search link 633, a New Search link 635, a residential search link 637, a Business/Government Search link 639, a Reverse Search link 641, a Feedback link 643, and a Help link 645. In an exemplary embodiment, the results, listings 647 and 649, are sorted in ascending by field values in the following hierarchy: Last Name, First Name, State, City, and Directory number (Area code+telephone number). These fields are described below in Table 4.

TABLE 4

| Data Element | Description |
|---|---|
| Last Name/ Business Name | In the case of a residential listing - the last name of the directory assistance listing. In the case of a business/government listing - the name associated with the business/government listing. |
| First Name | First name of the directory assistance listing (applicable for residential listings only.) |
| Address | Address (Street and House number) of the listing |
| City | City of the directory assistance listing |
| State | State of the directory assistance listing |
| Zip | Zip code of the directory assistance listing |
| Area Code (NPA) | Area Code (NPA) of the directory assistance listing |
| Number | 7-digit number associated with the record's Area Code (NPA) |

For the purpose of illustration, the search result screen 631 provides multiple listings for the reverse search. It is, however, more common to receive a single listing, as directory numbers are typically unique to a particular party.

In addition to information retrieval, the customer is afforded the capability to maintain its own enhanced content in database 101, as shown in FIG. 31B.

Figure 7:
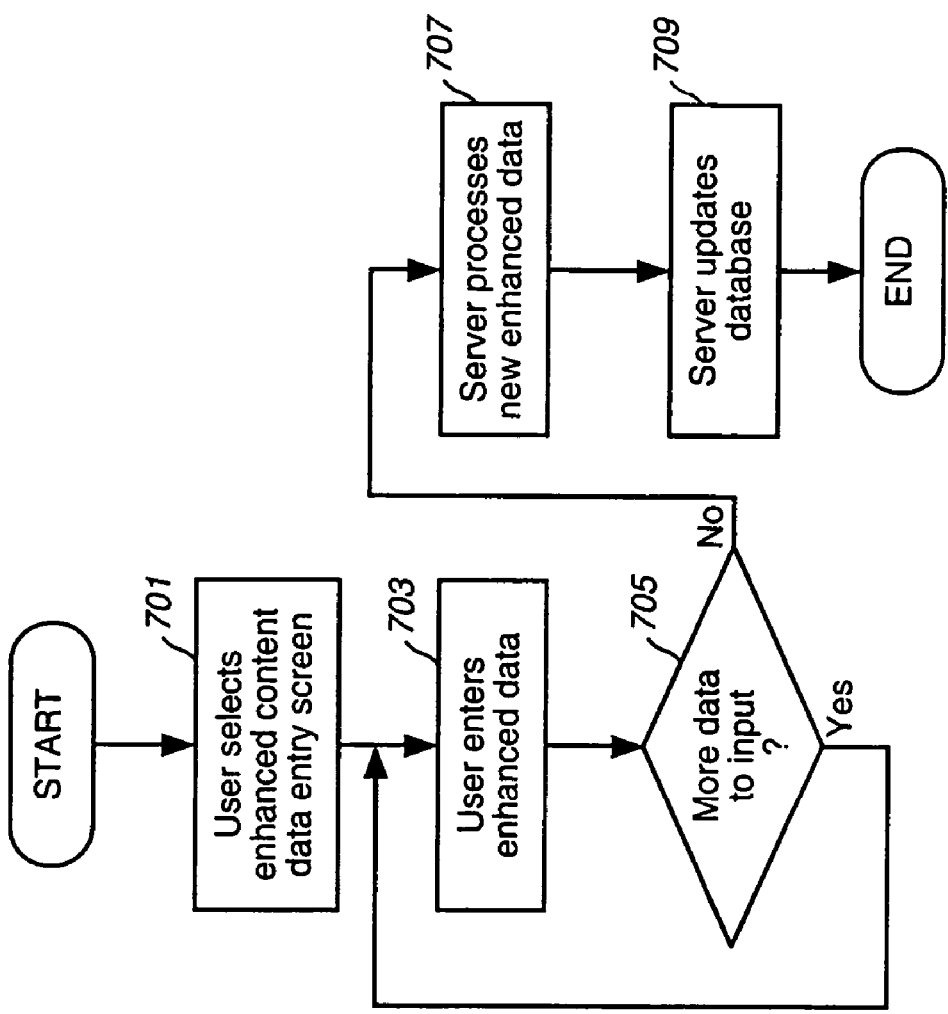
FIG. 7 is a flow chart of a process for maintaining enhanced content in a database, in accordance with an embodiment of the present invention.

FIG. 7 shows a flow chart of a process for maintaining enhanced content in a database, in accordance with an embodiment of the present invention. The web and application server 131 provides a mechanism for the customer to modify, add, and delete directory listings that are stored within database 101 with respect to the enhanced content. As discussed above, the enhanced content may include any number of parameters that the customer wishes to maintain for the particular directory listing; e.g., one or more e-mail address fields, a fax number field, a mobile number field, pager number field, a voice-mail number field, and a URL field. It is recognized that the specific enhanced data depends on the type of party the listing pertains. For example, a business will not usually have a mobile telephone number; however, it is common for an individual person to have such a number. First, the user navigates to the data entry screen for the enhanced content, per step 701. Next, the server 131 returns an entry screen depending on whether the user seeks to add a new entry or modify an existing entry. FIG. 8, below, shows an exemplary entry screen for modifying an existing entry. Subsequently, the user via client browser 105, as in step 703, enters the enhanced data. If more data entry is needed as determined by step 705, the user repeats step 703. Once the data entry is complete, the server 131 processes the new enhanced data, per step 707. Thereafter, the server 131 instructs the update of the enhanced data in database 101.

FIG. 8 shows diagram of an enhanced content data entry screen of a GUI, in accordance with an embodiment of the present invention. In this example, it is assumed that the user has entered information about the particular listing that the user wishes to modify prior to the display of the screen 800. The data entry screen 800 displays the basic content of the listing 801 that the user has entered, which in this case, is a business by the name of "Acme Cans." The user has wishes to maintain additional information about this particular listing; specifically, the user seeks to input a facsimile number, an e-mail address, and the URL of Acme's website. These data can be entered through the corresponding fields: a facsimile number field 803, an e-mail address field 805, and a URL field 807. Upon entering the information, the user can submit the new enhanced data by clicking on a Submit button 809. If the user wishes to clear all of the fields 803, 805, and 807, then the user may use the Reset button 811. The above entry screen and associated entry process of FIG. 7 provides significant advantages over the conventional on-line directory systems, which lack the flexibility to permit the customer to tailor the directory listings to the needs of the customer.

Figure 9:
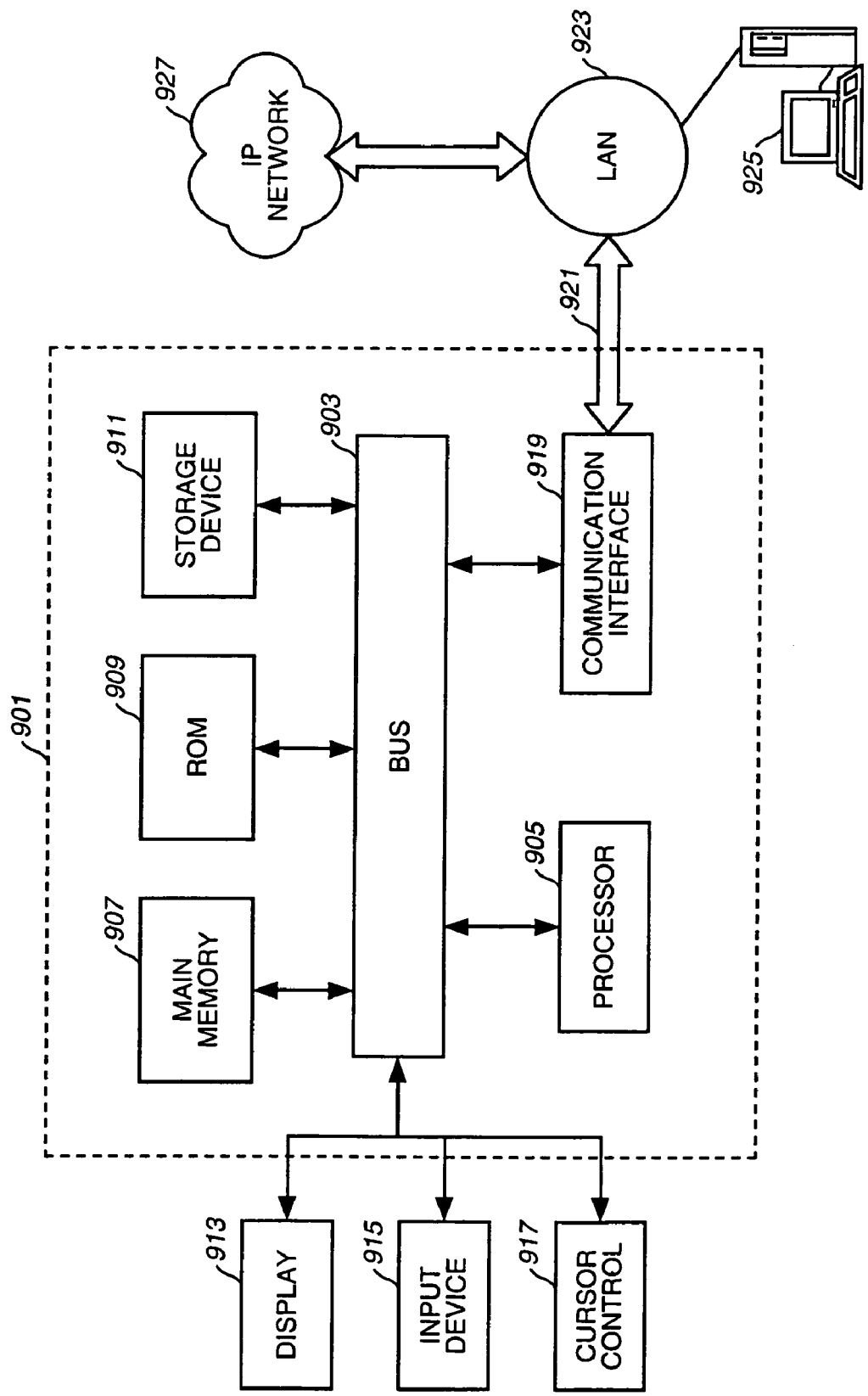
FIG. 9 is a diagram of a computer system that is capable of performing directory assistance functions, in accordance with an embodiment of the present invention.

FIG. 9 illustrates a computer system upon which an embodiment according to the present invention may be implemented. Computer system 901 includes a bus 903 or other communication mechanism for communicating information, and a processor 905 coupled with bus 903 for processing the information. Computer system 901 also includes a main memory 907, such as a random access memory (RAM) or other dynamic storage device, coupled to bus 903 for storing information and instructions to be executed by processor 905. In addition, main memory 907 may be used for storing temporary variables or other intermediate information during execution of instructions to be executed by processor 905. Computer system 901 further includes a read only memory (ROM) 909 or other static storage device coupled to bus 903 for storing static information and instructions for processor 905. A storage device 911, such as a magnetic disk or optical disk, is provided and coupled to bus 903 for storing information and instructions.

Computer system 901 may be coupled via bus 903 to a display 913, such as a cathode ray tube (CRT), for displaying information to a computer user. An input device 915, including alphanumeric and other keys, is coupled to bus 903 for communicating information and command selections to processor 905. Another type of user input device is cursor control 917, such as a mouse, a trackball, or cursor direction keys for communicating direction information and command selections to processor 905 and for controlling cursor movement on display 913.

According to one embodiment, the information retrieval and data entry processes are provided by computer system 901 in response to processor 905 executing one or more sequences of one or more instructions contained in main memory 907. Such instructions may be read into main memory 907 from another computer-readable medium, such as storage device 911. Execution of the sequences of instructions contained in main memory 907 causes processor 905 to perform the process steps described herein. One or more processors in a multi-processing arrangement may also be employed to execute the sequences of instructions contained in main memory 907. In alternative embodiments, hardwired circuitry may be used in place of or in combination with software instructions. Thus, embodiments are not limited to any specific combination of hardware circuitry and software.

Further, the information retrieval and data entry processing instructions of the communication system 100 may reside on a computer-readable medium. The term "computer-readable medium" as used herein refers to any medium that participates in providing instructions to processor 905 for execution. Such a medium may take many forms, including but not limited to, non-volatile media, volatile media, and transmission media. Non-volatile media includes, for example, optical or magnetic disks, such as storage device 911. Volatile media includes dynamic memory, such as main memory 907. Transmission media includes coaxial cables, copper wire and fiber optics, including the wires that comprise bus 903. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk of a remote computer. The remote computer can load the instructions relating to information retrieval and data entry remotely into its dynamic memory and send the instructions over a telephone line using a modem. A modem local to computer system 901 can receive the data on the telephone line and use an infrared transmitter to convert the data to an infrared signal. An infrared detector coupled to bus 903 can receive the data carried in the infrared signal and place the data on bus 903. Bus 903 carries the data to main memory 907, from which processor 905 retrieves and executes the instructions. The instructions received by main memory 907 may optionally being stored on storage device 911 either before or after execution by processor 905.

Computer system 901 also includes a communication interface 919 coupled to bus 903. Communication interface 919 provides a two-way data communication coupling to a network link 921 that is connected to a local network 923. For example, communication interface 919 may be a network interface card to attach to any packet switched local area network (LAN). As another example, communication interface 919 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 919 sends and receives electrical, electromagnetic or optical signals that carry digital data streams representing various types of information.

Network link 921 typically provides data communication through one or more networks to other data devices. For example, network link 921 may provide a connection through local network 923 to a host computer 925 or to data equipment operated by a service provider, which provides data communication services through a communication network 927 (e.g., the Internet). LAN 923 and network 927 both use electrical, electromagnetic or optical signals that carry digital data streams. The signals through the various networks and the signals on network link 921 and through communication interface 919, which carry the digital data to and from computer system 901, are exemplary forms of carrier waves transporting the information. Computer system 901 can transmit notifications and receive data, including program code, through the network(s), network link 921 and communication interface 919.

The techniques described herein provide several advantages over prior approaches to providing on-line information retrieval. A user via a user interface transmits an information request to a server, which in turn responds with information in which only a portion of the information is displayed to the user; that is, some of the information is hidden. Upon selecting the particular set of information the user desires, the server forwards the remaining portion of the information. This selection process has particular applicability to directory assistance services, whereby the actual directory listings that are retrieved by the users are tracked. This arrangement advantageously provides the capability to accurately compensate the data providers, resulting in cost savings for the service provider and ultimately the customer.

Obviously, numerous modifications and variations of the present invention are possible in light of the above teachings. It is therefore to be understood that within the scope of the appended claims, the invention may be practiced otherwise than as specifically described herein.

What is claimed is:

1. A method for providing directory assistance services over a packet switched network, comprising:
    receiving a request message from an access device for directory information;
    forwarding the directory information to the access device in response to the request message, wherein the directory information is partitioned into a plurality of data types, the data types including viewable data, encrypted data, and state data, the directory information being stored in a database that is remotely located from the access device;
    receiving a modification message to modify the directory information from the access device; and
    updating the database based upon receiving the modification message.

2. The method according to claim 1, wherein the data types include hidden data.

3. The method according to claim 1, further comprising:
    receiving a selection message from the access device, the selection message including encrypted data and state data associated with the directory information; and
    transmitting new visible data of the directory information associated with the encrypted data to the access device.

4. The method according to claim 3 further comprising:
    preparing billing information based upon the state data; and
    generating a report based upon the state data.

5. The method according to claim 1, wherein the directory information in the act of forwarding includes at least one of a name, an address, a directory number, a mobile number, a pager number, a facsimile number, a voice-mail, an e-mail address, or a Uniform Resource Locator (URL) identifier.

6. The method according to claim 1, wherein the forwarding is performed using a Hyper Text Transfer Protocol (HTTP), the packet switched network being an Internet Protocol (IP) network.

7. The method according to claim 1, wherein the access device includes a personal computer (PC), a personal digital assistant (PDA), a web-appliance, an e-mail client, a web-enabled cell phone, or a non-PC device.

8. The method according to claim 1, wherein the directory information is provided in part by a Regional Bell Operating Company (RBOC).

9. An apparatus for providing directory assistance services over a packet switched network, comprising:
    a communication interface configured to receive a request message from an access device for directory information; and
    a processor coupled to the communication interface and configured to forward the directory information to the access device in response to the request message, wherein the directory information is partitioned into a plurality of data types, the data types including viewable data, encrypted data, and state data, the directory information being stored in a database that is remotely located from the access device, wherein the processor receives a modification message to modify the directory information from the access device, the processor instructing update of the database based upon the modification message.

10. The server according to claim 9, wherein the data types include hidden data.

11. The server according to claim 9, wherein the processor receives a selection message from the access device, the selection message including encrypted data and state data associated with the directory information, the communication interface transmitting new visible data of the directory information associated with the encrypted data to the access device.

12. The server according to claim 11, wherein billing information or a report is generated based upon the state data.

13. The server according to claim 9, wherein the directory information includes at least one of a name, an address, and a directory number, a mobile number, a pager number, a facsimile number, a voice-mail, an e-mail address, or a Uniform Resource Locator (URL) identifier.

14. The server according to claim 9, wherein the communication interface is configured to use a Hyper Text Transfer Protocol (HTTP) to communicate with the access device, the packet switched network being an Internet Protocol (IP) network.

15. The server according to claim 9, wherein the access device includes a personal computer (PC), a PDA (personal digital assistant), a web-appliance, an e-mail client, a web-enabled cell phone, or a non-PC device.

16. The server according to claim 9, wherein the directory information is provided in part by a Regional Bell Operating Company (RBOC).

17. An on-line directory assistance service system, the system comprising:
    a server configured to receive a request message for directory information over a packet switched network from an access device, the server being configured to forward the directory information to the access device in response to the request message, wherein the directory information is partitioned into a plurality of data types, the data types including viewable data, encrypted data, and state data; and
    a database coupled to the server and configured to store the directory information, wherein the server is further configured to receive a modification message to modify the directory information in the database from the access device, and to update the database based upon the modification message.

18. The system according to claim 17, wherein the data types include hidden data.

19. The system according to claim 17, wherein the server receives a selection message from the access device, the selection message including encrypted data and state data associated with the directory information, the communication interface transmitting new visible data of the directory information associated with the encrypted data to the access device.

20. The system according to claim 17, wherein billing information or a report is generated based upon the state data.

21. The system according to claim 19, wherein the directory information includes at least one of a name, an address, a directory number, a mobile number, a pager number, a facsimile number, a voice-mail, an e-mail address, or a Uniform Resource Locator (URL) identifier.

22. The system according to claim 17, wherein the server is configured to use a Hyper Text Transfer Protocol (HTTP) to communicate with the access device, the packet switched network being an Internet Protocol (IP) network.

23. The system according to claim 17, wherein the access device includes a personal computer (PC), a PDA (personal digital assistant), a web-appliance, an e-mail client, a web-enabled cell phone, or a non-PC device.

24. The server according to claim 17, wherein the directory information is provided in part by a Regional Bell Operating Company (RBOC).

* * * * *